(12) United States Patent
Huang

(10) Patent No.: US 8,971,680 B2
(45) Date of Patent: Mar. 3, 2015

(54) WAVEGUIDE WITH CONTROLLED LIGHT COLLIMATION

(75) Inventor: Jiandong Huang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 424 days.

(21) Appl. No.: 13/532,076

(22) Filed: Jun. 25, 2012

(65) Prior Publication Data

US 2013/0314943 A1    Nov. 28, 2013

Related U.S. Application Data

(63) Continuation-in-part of application No. 13/484,346, filed on May 31, 2012, now Pat. No. 8,630,518, which is a continuation-in-part of application No. 13/477,922, filed on May 22, 2012.

(51) Int. Cl.
    *G02B 6/26*    (2006.01)
    *F21V 7/04*    (2006.01)

(52) U.S. Cl.
    USPC .............................. 385/39; 385/901; 362/606

(58) Field of Classification Search
    CPC ............................ G02B 6/0035; G02B 6/0036
    USPC ........................................................ 385/39, 901
    See application file for complete search history.

(56) References Cited

U.S. PATENT DOCUMENTS

| | | | |
|---|---|---|---|
| 6,657,683 B2 * | 12/2003 | Richard | 349/63 |
| 7,537,369 B2 * | 5/2009 | Takata | 362/606 |
| 7,733,439 B2 * | 6/2010 | Sampsell et al. | 349/62 |

* cited by examiner

*Primary Examiner* — Omar R Rojas
(74) *Attorney, Agent, or Firm* — Law Office of Gerald Maliszewski; Gerald Maliszewski

(57) ABSTRACT

A method is provided for controlling the collimation of light from a backlight top surface. A backlight device includes a first waveguide and a transparent top film overlying the first waveguide top surface. A plurality of bubble structures is formed in the top film bottom surface, having a refractive index less than a first waveguide medium. A plurality of lenses overlies the top film top surface, where each lens is aligned overlying a corresponding gap (W) between bubble structures. The method forms a maximum angle ($\alpha$) of light propagation through the first waveguide medium. In response to the values W and H (bubble structure height), light, having the maximum angle ($\alpha$) of light propagation, is reflected off the bubble structure sides, through total internal reflection, into the top film. The method collimates in a vertical direction, orthogonal to the horizontal direction, light exiting the top film through the lenses.

23 Claims, 9 Drawing Sheets

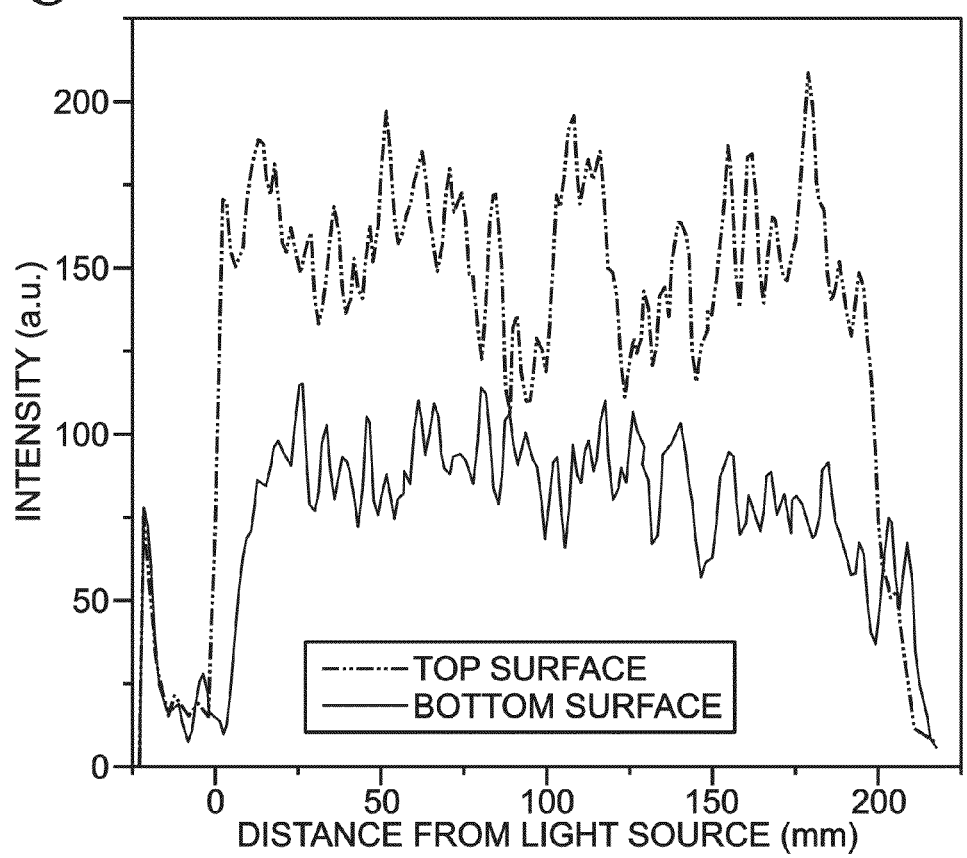
Fig. 3 *(PRIOR ART)*

WAVEGUIDE WITH CONTROLLED LIGHT COLLIMATION

RELATED APPLICATIONS

This application is a Continuation-in-Part of an application entitled, ULTRA-THIN WAVEGUIDE WITH CONTROLLED LIGHT EXTRACTION, invented by Jiandong Huang et al., Ser. No. 13/484,346, filed May 31, 2012 now U.S. Pat. No. 8,630,518, which is a Continuation-in-Part of an application entitled, METHOD FOR THE DESIGN OF UNIFORM WAVEGUIDE LIGHT EXTRACTION, invented by Jiandong Huang et al., Ser. No. 13/477,922, filed May 22, 2012. Both these applications are incorporated herein by reference.

BACKGROUND OF THE INVENTION

1. Field of the Invention

This invention generally relates to light waveguide mediums and, more particularly, to a system and method for controlling the collimation of light extracted from a backlight device.

2. Description of the Related Art

FIG. 1 is a plan view of representing light extracted from a liquid crystal display (LCD) backlight (prior art). Mura is a Japanese term for unevenness, inconsistency in physical matter, or human spiritual condition. This word is used in LCD to describe undesired illumination non-uniformity due to design or fabrication defects. Mura can come from both front and back panels. As shown in the figure, more light is being extracted near the input light emitting devices (LEDs) on the left side of the panel, than on the right side of the panel. The significant amount of light extracted near the light source leaves an insufficient amount of light to be extracted from the right side of the panel. Backlight panels are conventionally designed using a significant degree of trial-and-error to find the correct balance of light extraction and illumination.

FIG. 2 is a partial cross-sectional view of a liquid crystal display (LCD) backlight system (prior art). Ideally, the system is intended to extract and collimate light (from the light source) up, through the waveguide top surface, to illuminate an LC panel (not shown).

FIG. 3 is a diagram comparing the intensity of light extracted from the waveguide top and bottom surfaces (prior art). Often, as shown in FIG. 2, a reflection pattern is added to the bottom of the waveguide to minimize the amount of light exiting the waveguide through the bottom surface. Alternatively or in addition, as shown in FIG. 2, a reflector can be added under the waveguide bottom surface. However, both these solutions undesirably increase the thickness and complexity of the backlight system.

FIG. 4 is a partial cross-sectional view of a waveguide with a light extraction feature (prior art). With an LED 400 light input of 0° (parallel to the waveguide top surface 404), the maximum angle of light propagation α' inside the waveguide is:

$$\Omega \sim \sin^{-1}(1/n_W)$$

where $n_W$ is the index of waveguides. For a conventional backlight polymer with a refractive index ~1.49, the angle Ω is roughly 42°. Light rays within the cone of ±42° (where horizontal is 0°) result is light rays exiting the waveguide top surface in a cone of ±48° (where vertical is 0°). However, in different situations, either greater or lesser amounts of light collimation are desired.

With the addition of air bubble light extraction features 406 and a design that avoids the critical angle for total internal reflection, the light rays within the horizontal cone may be directed toward the top surface for light extraction with a greater degree of dispersion. In the best case dispersion scenario, light inside this angular cone of ±42° (horizontal) can be extracted within ~±32° (vertical). Increasing the dispersion of extracted light is useful for wide angle viewing.

FIG. 5 is a partial cross-sectional view of a waveguide light extraction feature with various angles of incident light (prior art). Depending on where light strikes the bubble structure, it may be reflected to the waveguide bottom surface (the rays marked "1"), extracted from the waveguide top surface due to total internal reflection (the rays marked "2"), or realigned at an angle where it is likely to strike another bubble structure at a favorable angle (the rays marked "3"). Conventionally, rays (1) reflected to the waveguide bottom surface have been an undesirable limitation associated with the use of light extraction features.

As noted in the application entitled, ULTRA-THIN WAVEGUIDE WITH CONTROLLED LIGHT EXTRACTION, invented by Jiandong Huang et al., Ser. No. 13/484,346, filed May 31, 2012, bubble structures can be used to enhance the degree of light collimation, as might be useful in narrow (private) angle viewing.

It would be advantageous if backlight panels and waveguide devices could be more efficiently designed to control the collimation of extracted light from a specified waveguide surface.

SUMMARY OF THE INVENTION

Disclosed herein are a system and method that take advantage of the shape and spatial arrangement of bubble structures in a waveguide, in combination with lenses, to control the angles of light collimation from the front side (top surface) of a backlight device.

Accordingly, a method is provided for controlling the collimation of light from a backlight top surface. A backlight device is used, which includes a first waveguide and a transparent top film overlying the first waveguide top surface. A plurality of bubble structures is formed in the top film bottom surface, having a refractive index less than a first waveguide medium. The bubble structures have a base and sides formed at an acute angle upwards with respect to the base, are separated by gap (W), and have a height (H). A plurality of lenses overlies the top film top surface, where each lens is aligned overlying a corresponding gap (W). A maximum angle (α) of light propagation is formed through the first waveguide medium relative to a horizontal direction parallel to the first waveguide top surface. In response to the values W and H, light, having the maximum angle (α) of light propagation, is reflected off the bubble structure sides into the top film. The method collimates in a vertical direction, orthogonal to the horizontal direction, light exiting the top film through the lenses. At least part of the angle of collimation is due lens radius of curvature and lens cross-sectional area. Light having an angle of propagation through the first waveguide medium of less than the maximum angle (α), and greater than a minimum angle (B) reflects off the bubble structure sides. Otherwise, light intercepting the top film bottom surface at less than a critical angle for total internal reflection (TIR), less than the minimum angle (B), is reflected back into the first waveguide.

In another aspect, the backlight device includes a second waveguide with a top surface underlying first waveguide bottom surface. For wider dispersion light extraction, the first waveguide accepts light from the second waveguide, having a worst case vertical angle orthogonal the horizontal direction, and distributes the second waveguide light from the lenses in a plurality of directions between the vertical direction and the horizontal direction, in response to passing through the lenses.

Additional details of the above-described method, and a backlight device with controlled light collimation, are provided below.

BRIEF DESCRIPTION OF THE DRAWINGS

FIG. 3 is a diagram comparing the intensity of light extracted from the waveguide top and bottom surfaces (prior art).

DETAILED DESCRIPTION

Figure 6:
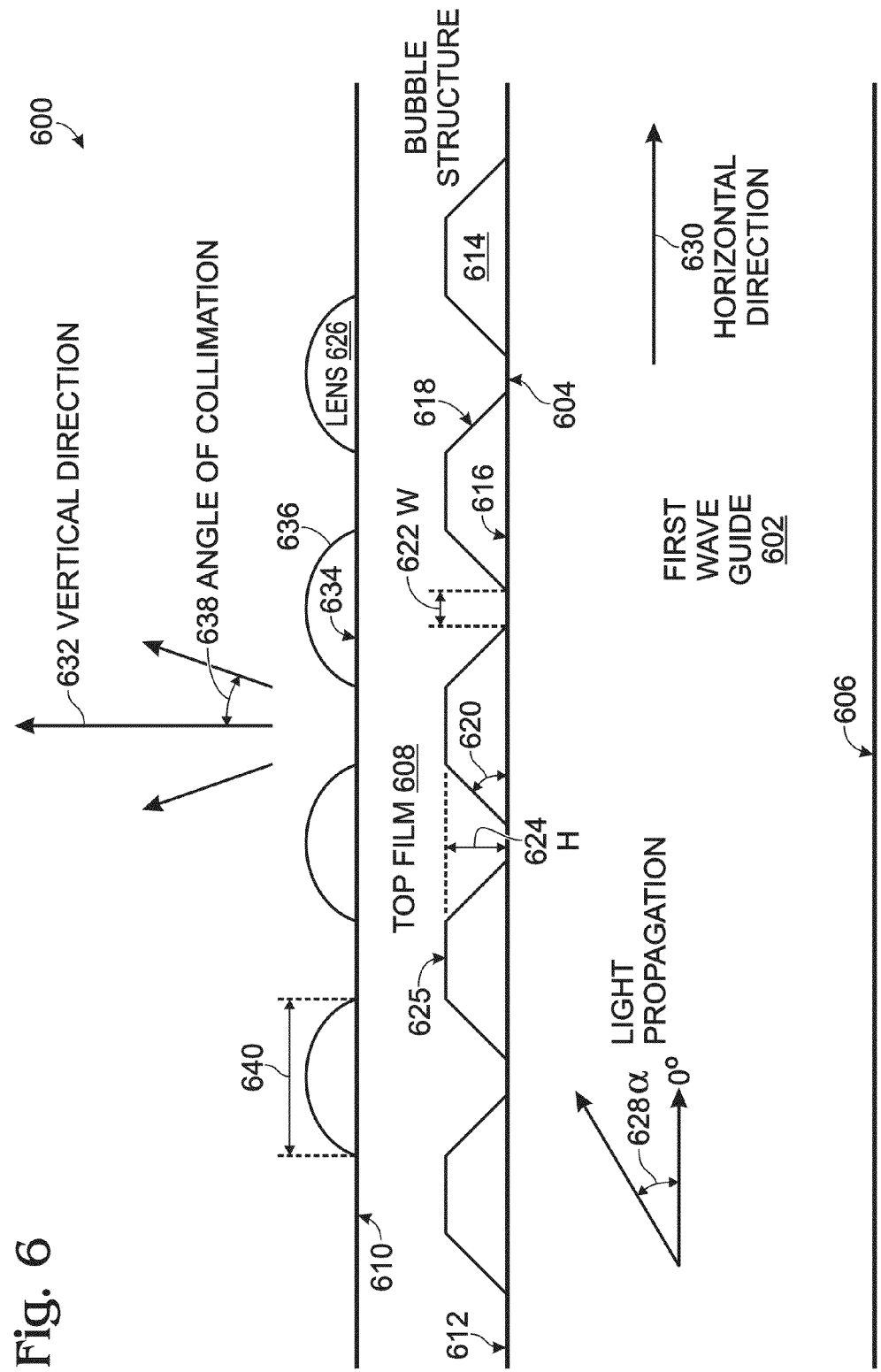
FIG. 6 is a partial cross-sectional view of a backlight device with controlled light collimation.

FIG. 6 is a partial cross-sectional view of a backlight device with controlled light collimation. The backlight device 600 comprises a first waveguide 602 with a top surface 604 and a bottom surface 606. A transparent top film 608 has a top surface 610, and a bottom surface 612 overlying the first waveguide top surface 604. A plurality of bubble structures 614 is formed in the top film bottom surface 612, having a refractive index less than a first waveguide medium. For example, if the first waveguide is made from a polymer or glass, then it has an index of refraction (n) of about 1.5. Then, the bubble structures can be made from air, having a refractive index of 1. Other gases and materials may also be used to form the bubble structures.

The bubble structures 614 have a base 616 and sides 618 formed at an acute angle 620 upwards (i.e. towards the top surface 610) with respect to the base. The bubble structures 614 are separated by gap (W) 622, and have a height (H) 624. The bubble structures are frustum bubble structures with flat top surfaces 625 parallel to the waveguide top surface 604. Some examples of frustum structures include a frustum-pyramid (as shown) and a frustum-cone. Other bubble structures need not have a flat top surface. A plurality of lenses 626 overlies the top film top surface 610, where each lens is aligned overlying a corresponding gap (W) 622.

W 622 and H 624 are defined with respect to a maximum angle (α) of light propagation 628 through the first waveguide medium relative to a horizontal direction 630 parallel to the first waveguide top surface 604. The lenses 626 accept light reflected off the bubble structure sides 616 into the top film 608, and collimate the light in a vertical direction 632, orthogonal to the horizontal direction 630. Although the values of W and H have some effect on the angles of collimation, they have a greater effect on the spread of light rays propagating though the first waveguide that can be collected and reflected up towards the lenses. As used herein, the word "collimate" is defined as tending to confine light into a narrow range of extraction angles. It should also be understood that while collimated light may ideally be extracted from the backlight device in only the vertical direction 632, practically there exists a rage of collimation angles±the vertical direction.

In one aspect as shown, the lenses 626 are plano-convex lenses, where the planar lens surface 634 overlies the top film top surface 610, and where light exits the lens convex surface 636 with an angle of collimation 638 responsive to the convex radius of curvature and lens cross-sectional area 640. In the case of a circular lens, the cross-sectional area 640 is a diameter.

Figure 7:
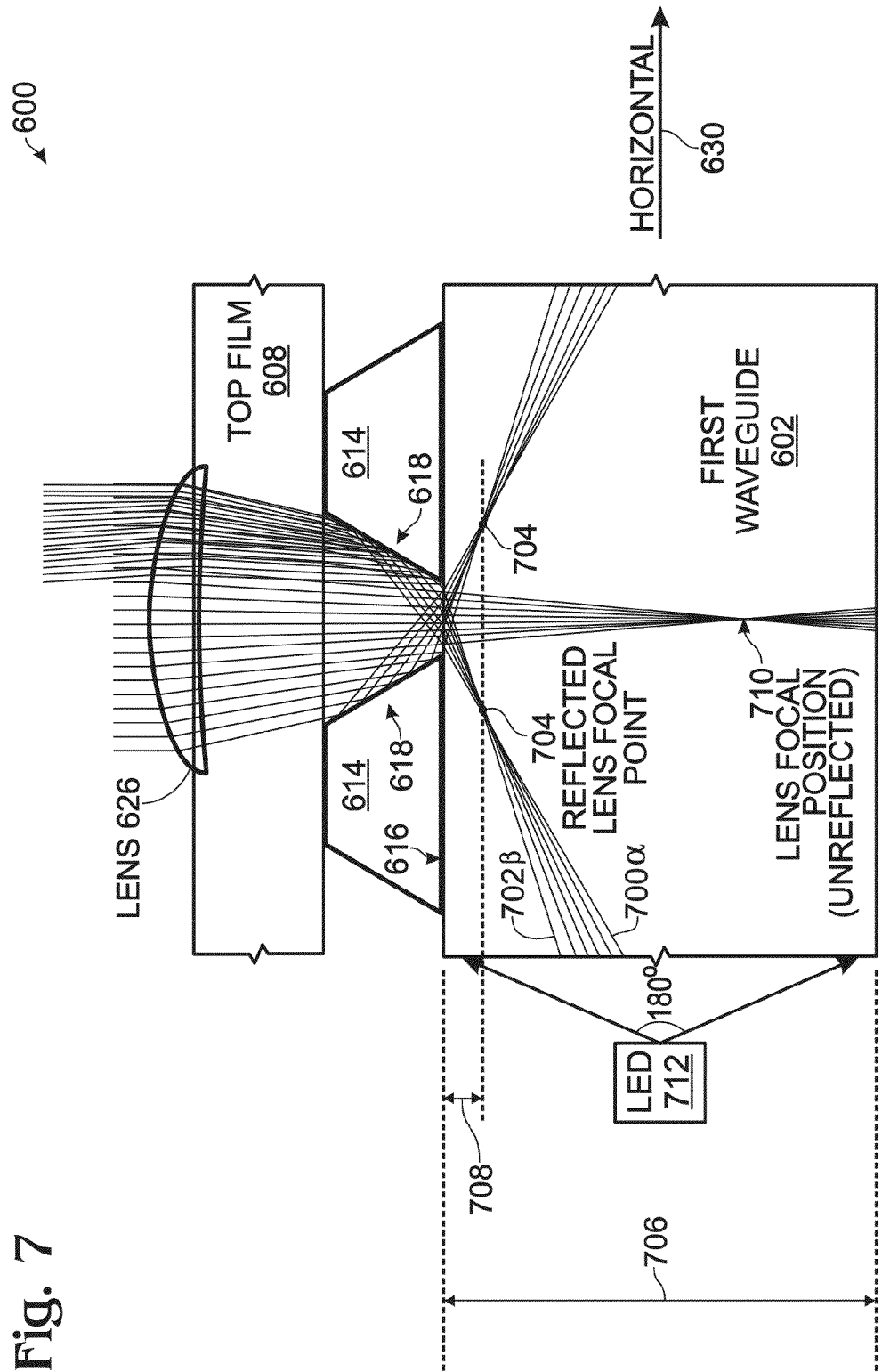
FIG. 7 is a more detailed depiction of the backlight device of FIG. 6.

FIG. 7 is a more detailed depiction of the backlight device of FIG. 6. The bubble structure sides 618 reflect light into the top film 608, accepted at an angle of light propagation through the first waveguide medium that is less than the maximum angle (α), and greater than a minimum angle (B). Rays with incidental angles outside this range are not fully collimated, resulting in a slightly broader distribution of angles than 0° (vertical). The distribution angles can be broadened by tuning the angle of the bubble structure sides 618 and the lens' radius of curvature. As shown, rays associated with angle (α) 700 are marked 700 and rays associated with angle (B) and marked 702. The maximum light intensity from the light source (not shown) into the first waveguide panel 602 is presented in the horizontal direction 630.

Each lens 626 forms a set of reflected focal points 704 in the first waveguide medium. Each reflected focal point 704 is associated with reflections off a corresponding bubble structure side 618, incident to the sides with angles greater than the critical angle for total internal reflection, so that stray light rays and losses are minimized. The reflected focal points 704 are located under that bubble structure 614 from which the light rays are reflected. The first waveguide 602 has a thickness 706. The lens reflected focal points 704 are formed at a first distance 708 from the first waveguide top surface 604, less than the first waveguide thickness 706. Also shown is the lens focal position 710 for rays that would reach the lens 626 without reflecting off a bubble structure side 618. The angles of these rays (about 90° with respect to horizontal 630) are greater than (α) 700 and, therefore, do not occur as a result of the first waveguide light source 712 through regular coupling. However, as explained in greater detail below, light rays with these angles may be sourced from an optional underlying second waveguide.

It can be seen from the figure that light rays not passing through the reflected focal points 704, and therefore not extracted by reflection off the bubble structure sides 618, would encounter the bubble structure bottom surfaces 616. Thus, light extraction is a function of the aperture (W 622) between bubble structures 614. The bubble structure bottom surfaces 616 reflect incident light since the light rays are at less than a critical angle for total internal reflection (TIR). That is, the critical angle for TIR is less than, or equal to the minimum angle (B) 702.

The critical angle, in accordance with Snell's law, is the angle of incidence above which total internal reflection occurs. For a light ray passing from glass into air, the light emanating from the interface is bent. When the incident angle is increased sufficiently, the transmitted angle in air reaches 90 degrees, e.g., no light is transmitted into the bubble structure, but rather, is reflected. The critical angle can be found as follows:

$$n_1 \sin \theta_i = n_2 \sin \theta_r.$$

where n1 is the refractive index of first waveguide 602 and n2 is the refractive index of the bubble structure 614. Rearranging, the angle of incidence is:

$$\sin \theta_i = \frac{n_2}{n_1} \sin \theta_t,\ \text{or}$$
$$\sin \theta_i = \frac{n_2}{n_1}.$$

Figure 8:
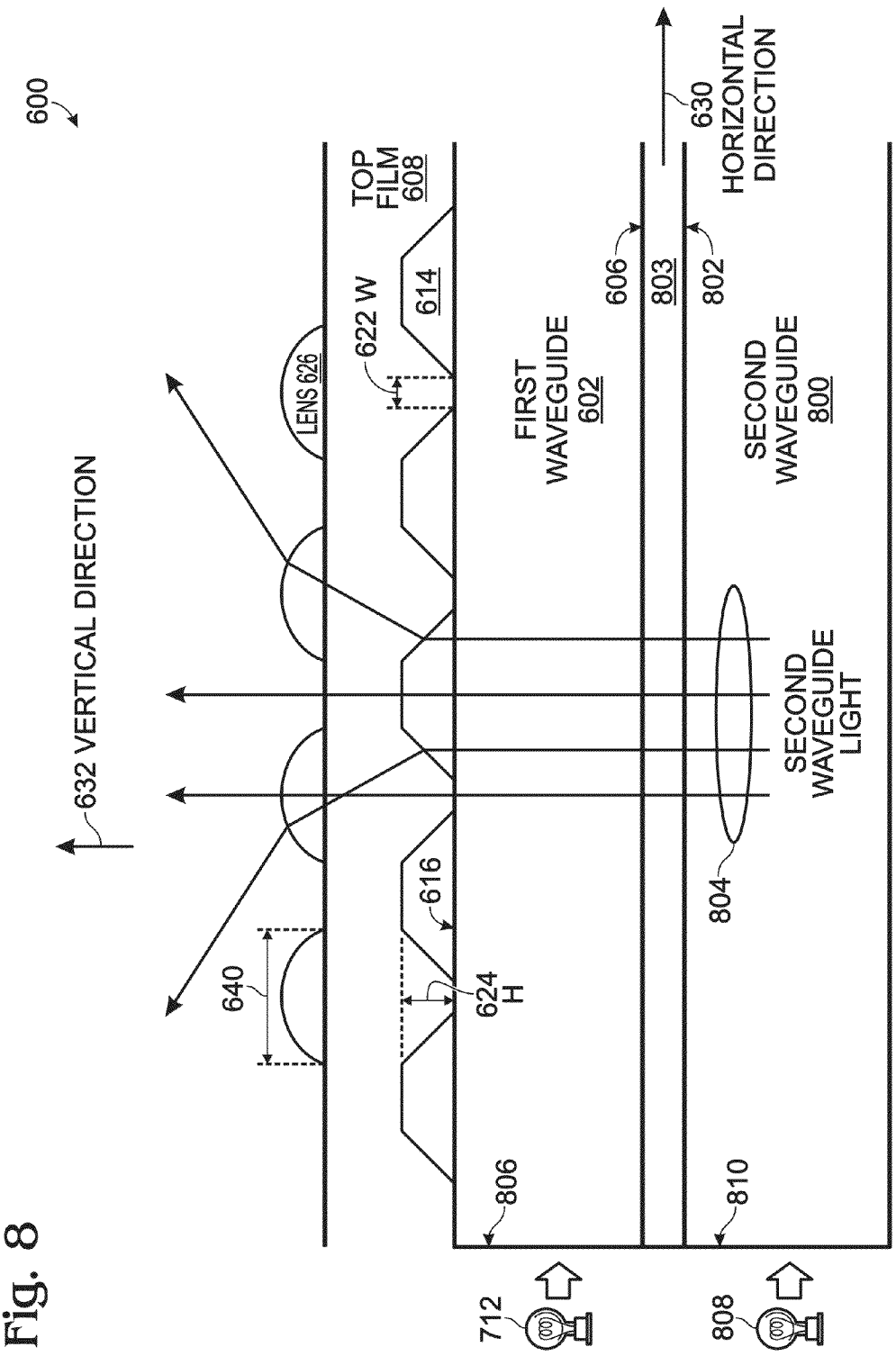
FIG. 8 is a partial cross-sectional view depicting a variation of the backlight device of FIG. 6.

FIG. 8 is a partial cross-sectional view depicting a variation of the backlight device of FIG. 6. In this aspect the backlight device 600 further comprises a second waveguide 800 with a top surface 802 underlying first waveguide bottom surface 606. Typically, the waveguides are separated by a material 803 having a lower index of refraction than either of the waveguides. In the worst case scenario, the first waveguide 602 accepts light 804 from the second waveguide, having a vertical angle orthogonal the horizontal direction 630. The lenses 626 distribute light from the second waveguide in a plurality of directions between the vertical direction 632 and the horizontal direction 630. It should be understood that any light sourced from the second waveguide that is not vertically aligned, it is also distributed in a plurality of directions and angles exiting the lenses.

W 622 and H 624 can be defined to randomize the distribution of second waveguide light meeting the bubble structure bottom surfaces 616 with incident angles greater than the critical angle for TIR. Then, the lenses 626 further randomize the distribution of second waveguide light passing through the bubble structures 614. Further, the lenses 626 distribute second waveguide light in a plurality of directions responsive the radius of curvature of the lenses and the lenses' cross-sectional area 640.

Figure 12:
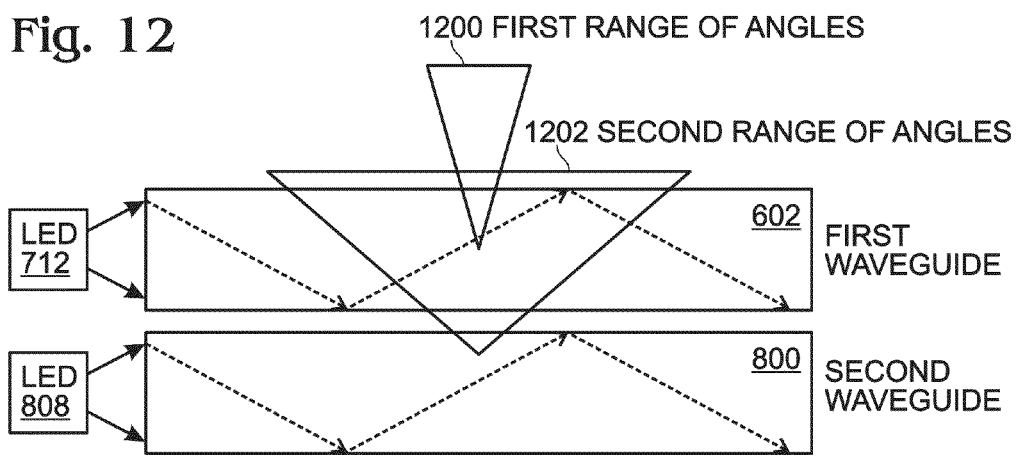
FIG. 12 is a partial cross-sectional view depicting the backlight device being used to create narrow and wide angles of collimation.

FIG. 12 is a partial cross-sectional view depicting the backlight device being used to create narrow and wide angles of collimation. Thus, the first light source 712 adjacent to first waveguide side 806 can be energized to supply light collimated in a first range of angles 1200, defined with respect to the vertical direction. A second light source 808 adjacent to the second waveguide side 810 can be energized to supply light distributed over a second range of angles, greater than the first range.

Figure 13:
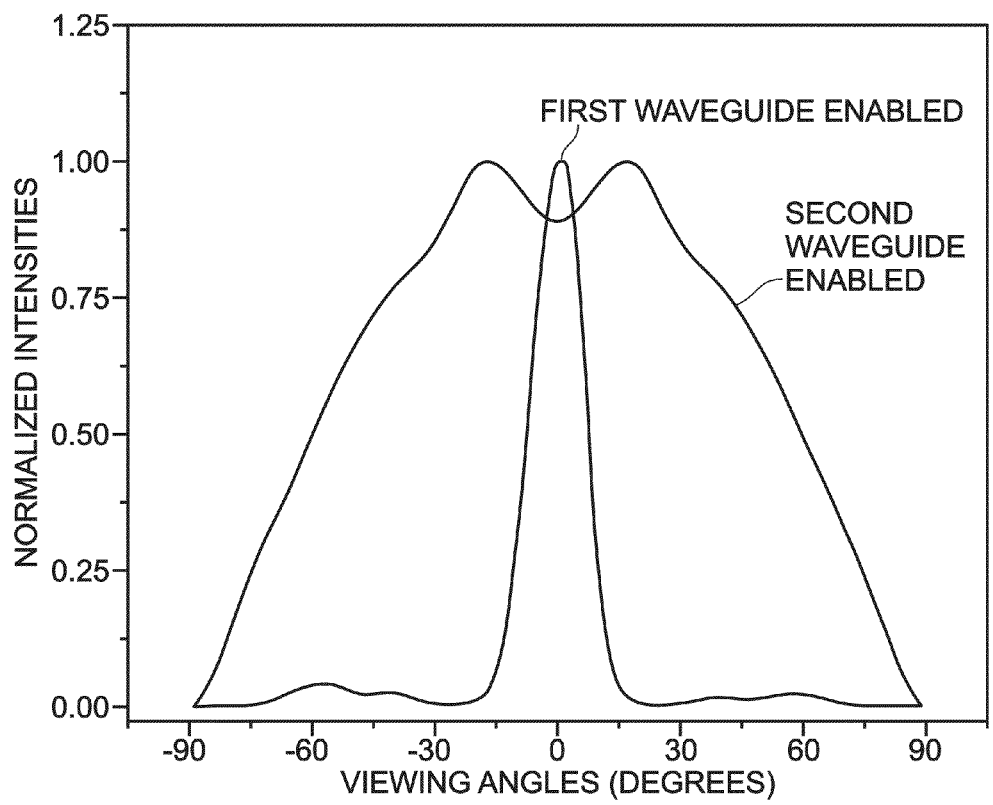
FIG. 13 is a graph comparing viewing angles (angles of collimation).

FIG. 13 is a graph comparing viewing angles (angles of collimation).

Functional Description

Figure 1:
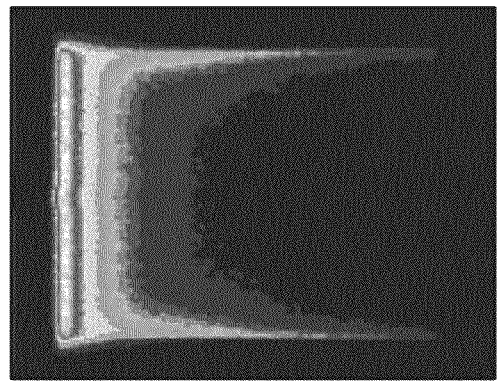
FIG. 1 is a plan view of representing light extracted from a liquid crystal display (LCD) backlight (prior art).
Figure 2:
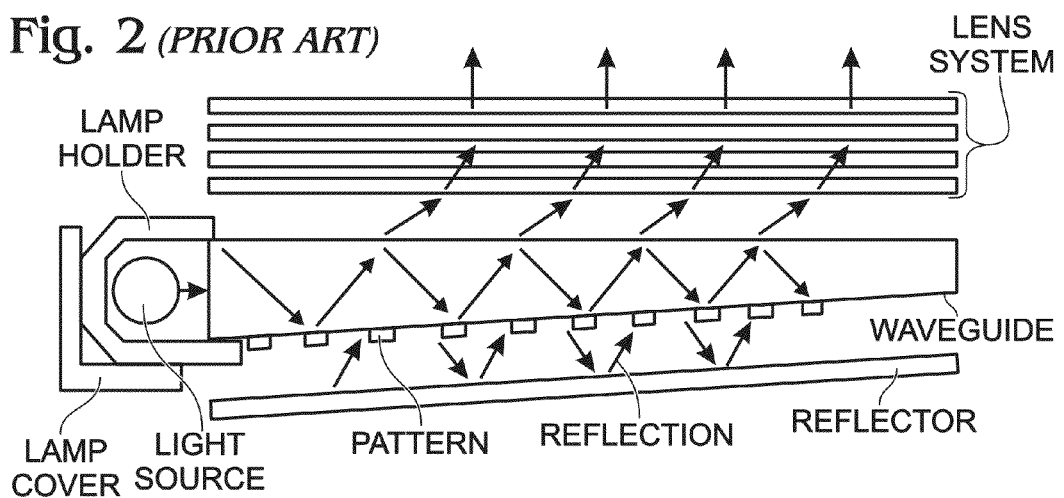
FIG. 2 is a partial cross-sectional view of a liquid crystal display (LCD) backlight system (prior art).
Figure 5:
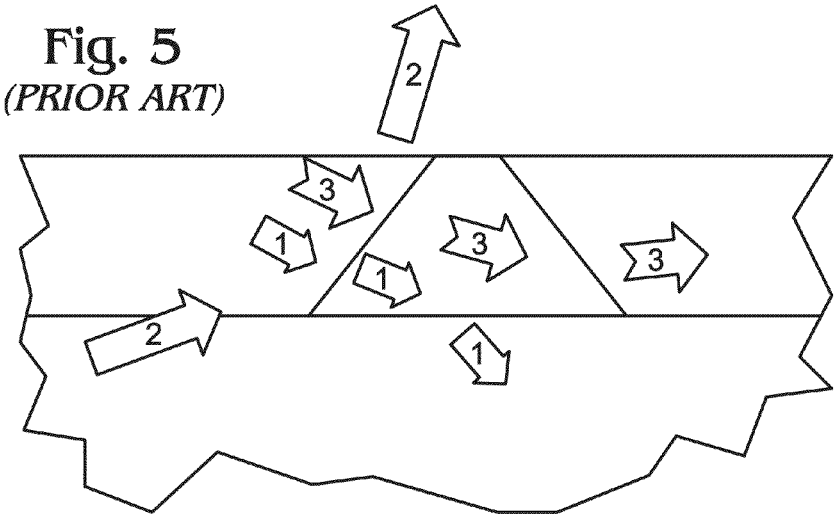
FIG. 5 is a partial cross-sectional view of a waveguide light extraction feature with various angles of incident light (prior art).
Figure 4:
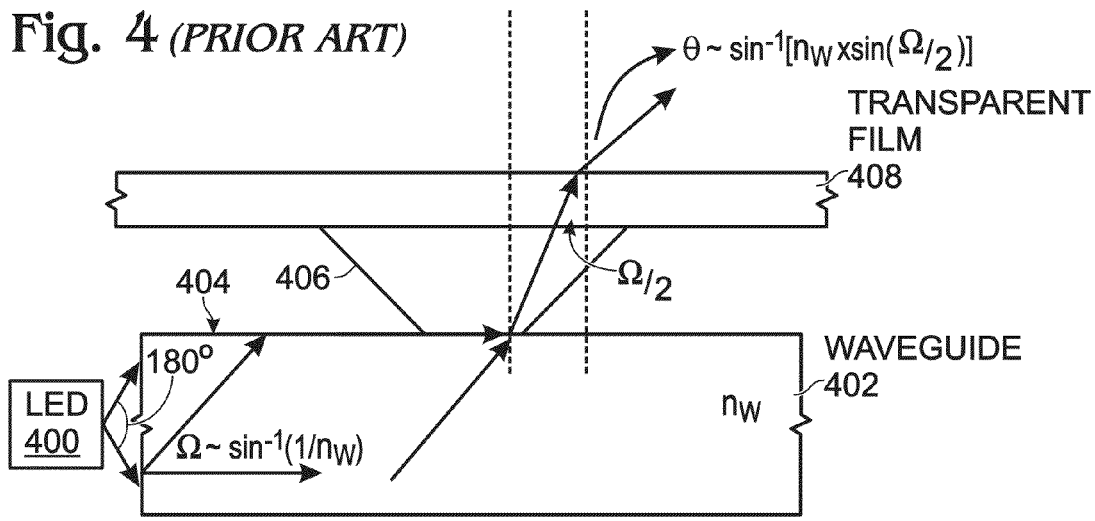
FIG. 4 is a partial cross-sectional view of a waveguide with a light extraction feature (prior art).
Figure 9:
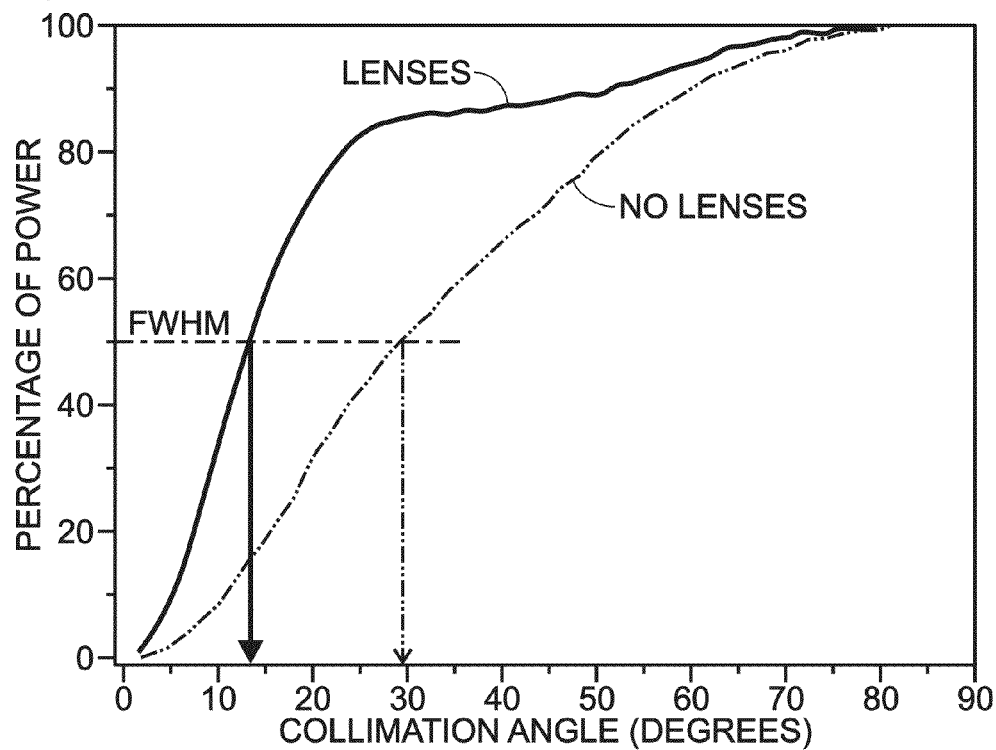
FIG. 9 is a graph of the percentage of light power exiting the waveguide top surface as a function of angle with respect to the normal (vertical) direction, contrasting the use of a lens with no lens.

FIG. 9 is a graph of the percentage of light power exiting the waveguide top surface as a function of angle with respect to the normal (vertical) direction, contrasting the use of a lens with no lens. The flat surfaces of the bubble structures are used to bend the focal positions inside the waveguide to collect light rays with an angle of less than ($\alpha$) and greater than (B). In order to gauge the improvements, half magnitude points (50% of total power) for the angles of collimation were contrasted as a means of measuring design progresses. The same bubble structure design was compared with, and without, the use of lenses (see FIG. 6). At a 50% Full Width at Half Maximum (FWHM) light energy level, ~30 degrees of collimation half angular width were required for the design with no lenses, while only ~13 degrees of collimation half angular width were required for the same design with lenses.

Figure 10A:
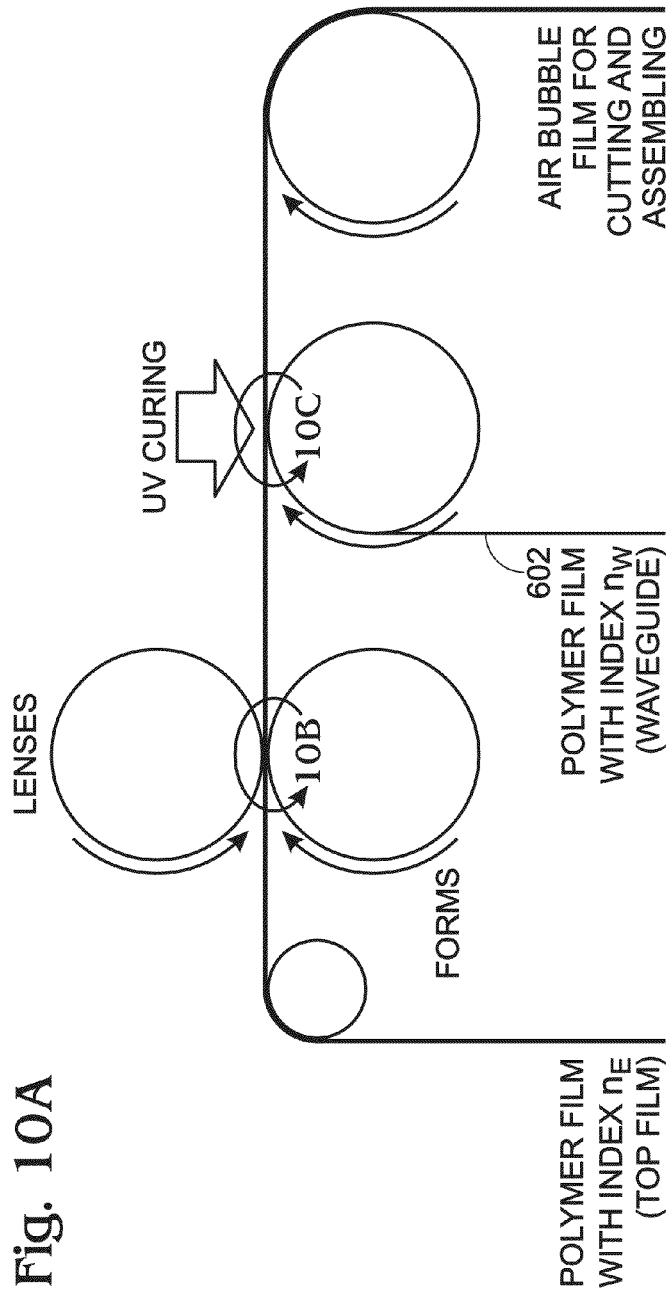
FIGS. 10A though 10C depict a process for fabricating the backlight device of FIGS. 6 and 7.
Figure 10C:
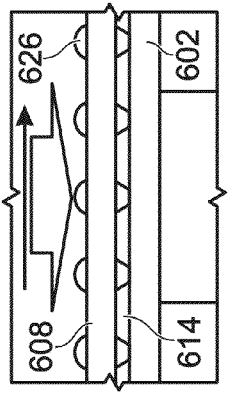
Figure 10B:
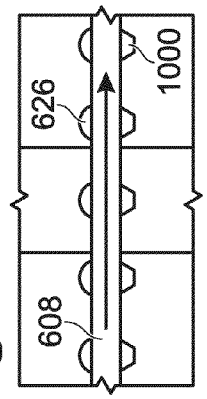

FIGS. 10A though 10C depict a process for fabricating the backlight device of FIGS. 6 and 7. The process begins with the transparent top film 606. As shown in FIG. 10B, the lenses are adhered to one side (i.e. the top surface) of the top film 608 and forms 1000, in the reverse shape of the bubble structures, are adhered to the top film bottom surface. As shown in FIG. 10A a compression process is shown to implant the forms into the top film, creating the bubble structures 614 between the forms. Then, the first waveguide is added. A detailed depiction is shown in FIG. 10C.

Figure 11:
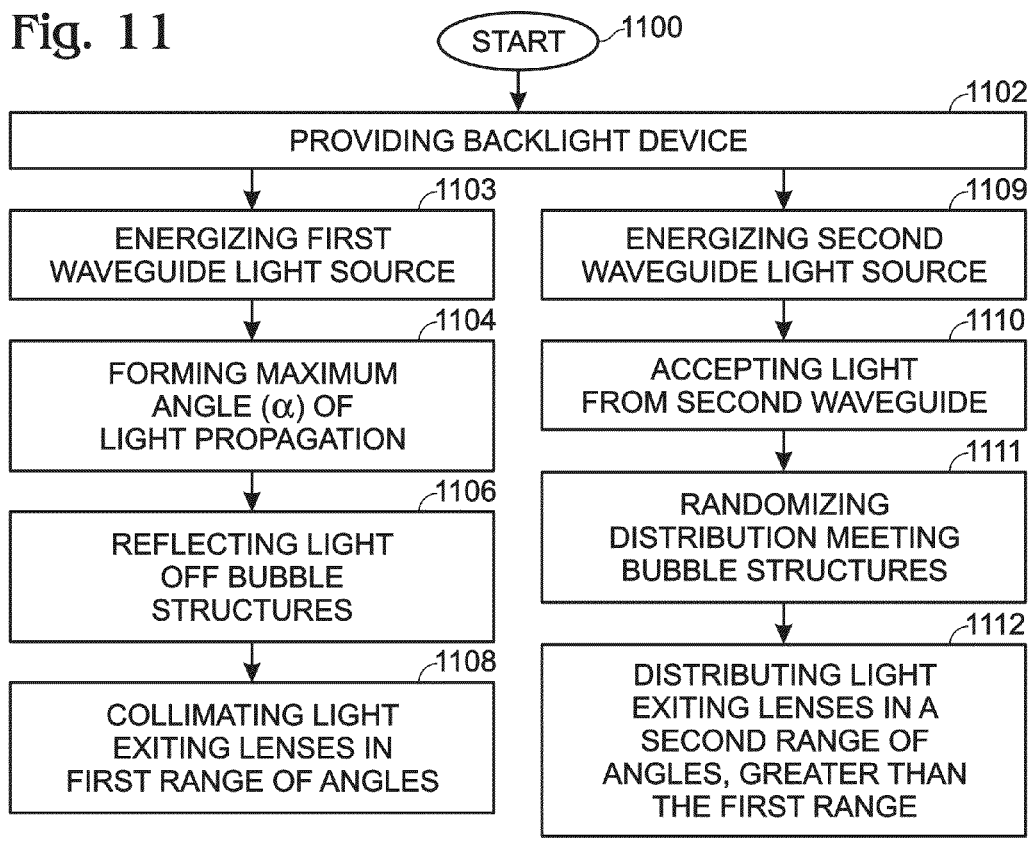
FIG. 11 is a flowchart illustrating a method for controlling the collimation of light from a backlight top surface.

FIG. 11 is a flowchart illustrating a method for controlling the collimation of light from a backlight top surface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 provides a backlight device comprising a first waveguide with a top surface and a bottom surface, and a transparent top film with a top surface, and a bottom surface overlying the first waveguide top surface. Step 1102 also provides a plurality of bubble structures formed in the top film bottom-surface, having a refractive index less than a first waveguide medium. If the first waveguide medium is polymer or gas, the bubble structures may be an air medium. The bubble structures have a base and sides formed at an acute angle upwards with respect to the base, are separated by gap (W), and have a height (H). Further, a plurality of lenses overlies the top film top surface, where each lens is aligned over a corresponding gap (W). Step 1104 forms a maximum angle ($\alpha$) of light propagation through the first waveguide medium relative to a horizontal direction parallel to the first waveguide top surface. In response to W and H values, Step 1106 reflects light, having the maximum angle ($\alpha$) of light propagation, off the bubble structure sides into the top film. Step 1108 collimates in a vertical direction, orthogonal to the horizontal direction, light exiting the top film through the lenses. In one aspect, Step 1102 provides plano-convex lenses, where the planar lens surface overlies the top film top surface. Then, collimating light in Step 1108 includes controlling the angle of collimation in response to the convex radius of curvature and lens cross-sectional area.

In one aspect, reflecting light off the bubble structure sides in Step 1106 includes reflecting light off the bubble structure sides, having an angle of light propagation through the first waveguide medium less than the maximum angle ($\alpha$), and greater than a minimum angle (B). Further, Step 1106 forms a set of reflected focal points in the first waveguide medium for each lens, where each reflected focal point is associated with reflections off a corresponding bubble structure side, and located under the reflecting bubble structure. The reflected focal points are formed a first distance from the first waveguide top surface, less than the first waveguide thickness.

In another aspect, reflecting light off the bubble structure sides in Step 1106 additionally includes the reflecting light intercepting the top film bottom surface at less than a critical angle for TIR, less than the minimum angle (B).

In one aspect, Step 1102 additionally provides a second waveguide with a top surface underlying first waveguide bottom surface. Then, in Step 1110 the first waveguide accepts light from the second waveguide, having a worst case vertical angle orthogonal the horizontal direction. Step 1112 distributes the second waveguide light from the lenses in a plurality of directions between the vertical direction and the horizontal direction, in response to passing through the lenses. In another aspect, in response to W and H values, Step 1111 randomizes the distribution of second waveguide light meeting the bubble structure bottom surfaces with incident angles greater than the critical angle for TIR. In other words, H and W may be adjusted to effect the distribution (range) of second waveguide light ray angles occurring as a result of intercepting the bubble structures. Then, Step 1112 randomizes the distribution passing through the lenses. That is, if the lenses receive a greater distribution of light ray angles, the lenses further increase the range of light ray angles exiting the lenses. Further, the distribution of second waveguide light from the lenses is responsive a radius of curvature of the lenses and the lenses' cross-sectional area.

In one aspect, Step 1103 energizes the first waveguide light source to supply light collimated in a first range of angles, defined with respect to the vertical direction, and Step 1109 energizes the second waveguide light source supplies light distributed over a second range of angles, greater than the first range.

A backlight device and method for controlling light collimation have been presented. Examples of particular bubble structures and lens shapes have been presented to illustrate the invention. However, the invention is not limited to merely these examples. Other variations and embodiments of the invention will occur to those skilled in the art.

I claim:

1. A method for controlling the collimation of light from a backlight top surface, the method comprising:
providing a backlight device comprising:
a first waveguide with a top surface and a bottom surface;
a transparent top film with a top surface, and a bottom surface overlying the first waveguide top surface;
a plurality of bubble structures formed in the top film bottom surface, having a refractive index less than a first waveguide medium, where the bubble structures have a base and sides formed at an acute angle upwards with respect to the base, are separated by gap (W), and have a height (H);
a plurality of lenses overlying the top film top surface, where each lens is aligned overlying a corresponding gap (W);
forming a maximum angle ($\alpha$) of light propagation through the first waveguide medium relative to a horizontal direction parallel to the first waveguide top surface;
in response to W and H values, reflecting light, having the maximum angle ($\alpha$) of light propagation, of the bubble structure sides into the top film;
collimating in a vertical direction, orthogonal to the horizontal direction, light exiting the top film through the lenses.

2. The method of claim 1 wherein providing the plurality of lenses includes providing plano-convex lenses, where the planar lens surface overlies the top film top surface; and, wherein collimating light includes controlling the angle of collimation in response to the convex radius of curvature and lens cross-sectional area.

3. The method of claim 1 wherein reflecting light off the bubble structure sides includes reflecting light off the bubble structure sides, having an angle of light propagation through the first waveguide medium less than the maximum angle ($\alpha$), and greater than a minimum angle (B).

4. The method of claim 3 wherein reflecting light off the bubble structure sides includes, for each lens, forming a set of reflected focal points in the first waveguide medium, where each reflected focal point is associated with reflections off a corresponding bubble structure side, and located under the reflecting bubble structure.

5. The method of claim 4 wherein providing the first waveguide includes providing the first waveguide with a thickness; and,
forming the reflected focal points includes forming the reflected focal points a first distance from the first waveguide top surface, less than the first waveguide thickness.

6. The method of claim 3 wherein reflecting light off the bubble structure sides into the top film includes the reflected light intercepting the top film bottom surface at less than a critical angle for total internal reflection (TIR), less than the minimum angle (B).

7. The method of claim 1 wherein providing the bubble structures includes providing bubble structures made from an air medium.

8. The method of claim 1 wherein providing the backlight device includes providing a second waveguide with a top surface underlying first waveguide bottom surface;
the method further comprising:
the first waveguide accepting light from the second waveguide, having a worst case vertical angle orthogonal the horizontal direction; and,
distributing the second waveguide light from the lenses in a plurality of directions between the vertical direction and the horizontal direction, in response to passing through the lenses.

9. The method of claim 8 further comprising:
in response to W and H values, randomizing the distribution of second waveguide light meeting the bubble structure bottom surfaces with incident angles greater than the critical angle for TIR; and,
wherein distributing the second waveguide light from the lenses includes randomizing the distribution passing through the lenses.

10. The method of claim 8 wherein distributing the second waveguide light from the lenses includes distributing light in a plurality of directions responsive a radius of curvature of the lenses and the lenses' cross-sectional area.

11. The method of claim 10 further comprising:
energizing a first waveguide light source to supply light collimated in a first range of angles defined with respect to the vertical direction; and,
energizing a second waveguide light source to supply light distributed over a second range of angles, greater than the first range.

12. A backlight device with controlled light collimation, the backlight device comprising:
a first waveguide with a top surface and a bottom surface;
a transparent top film with a top surface, and a bottom surface overlying the first waveguide top surface;
a plurality of bubble structures formed in the top film bottom surface, having a refractive index less than a first waveguide medium, where the bubble structures have a base and sides formed at an acute angle upwards with respect to the base, are separated by gap (W), and have a height (H); and, a plurality of lenses overlying the top film top surface, where each lens is aligned overlying a corresponding gap (W).

13. The backlight device of claim 12 wherein W and H are defined with respect to a maximum angle (α) of light propagation through the first waveguide medium relative to a horizontal direction parallel to the first waveguide top surface; and, wherein the lenses accept light reflected off the bubble structure sides into the top film, and collimate the light in a vertical direction, orthogonal to the horizontal direction.

14. The backlight device of claim 12 wherein the lenses are plano-convex lenses, where the planar lens surfaces overlie the top film top surface, and where light exits the lens convex surfaces with an angle of collimation responsive to the convex radius of curvature and lens cross-sectional area.

15. The backlight device of claim 12 wherein the bubble structure sides reflect light into the top film, accepted at an angle of light propagation through the first waveguide medium less than the maximum angle (α), and greater than a minimum angle (B).

16. The backlight device of claim 15 wherein each lens forms a set of reflected focal points in the first waveguide medium, each reflected focal point associated with reflections off a corresponding bubble structure side and located under the reflecting bubble structure.

17. The backlight device of claim 16 wherein the first waveguide has a thickness; and, wherein the lens reflected focal points are formed at a first distance from the first waveguide top surface, less than the first waveguide thickness.

18. The backlight device of claim 15 wherein the bubble structure bottom surfaces reflect incident light at less than a critical angle for total internal reflection (TIR) less than the minimum angle (B).

19. The backlight device of claim 12 wherein the bubble structures are an air medium.

20. The backlight device of claim 12 further comprising:
a second waveguide with a top surface underlying first waveguide bottom surface;
wherein the first waveguide accepts light from the second waveguide, having a worst case vertical angle orthogonal the horizontal direction; and,
wherein the lenses distribute the second waveguide light in a plurality of directions between the vertical direction and the horizontal direction.

21. The backlight device of claim 20 wherein W and H are defined to randomize the distribution of second waveguide light meeting the bubble structure bottom surfaces with incident angles greater than the critical angle for TIR; and,
wherein the lenses further randomize the distribution of second waveguide light passing through the bubble structures.

22. The backlight device of claim 20 wherein the lenses distribute second waveguide light in a plurality of directions responsive a radius of curvature of the lenses and the lenses' cross-sectional area.

23. The backlight device of claim 22 further comprising:
a first light source adjacent a first waveguide side, energized to supply light collimated in a first range of angles defined with respect to the vertical direction; and,
a second light source adjacent the second waveguide side, energized to supply light distributed over a second range of angles, greater than the first range.

* * * * *